Dec. 25, 1962  W. J. RIDDLE  3,070,478
BAND APPLYING METHOD
Filed Jan. 20, 1958
6 Sheets-Sheet 2
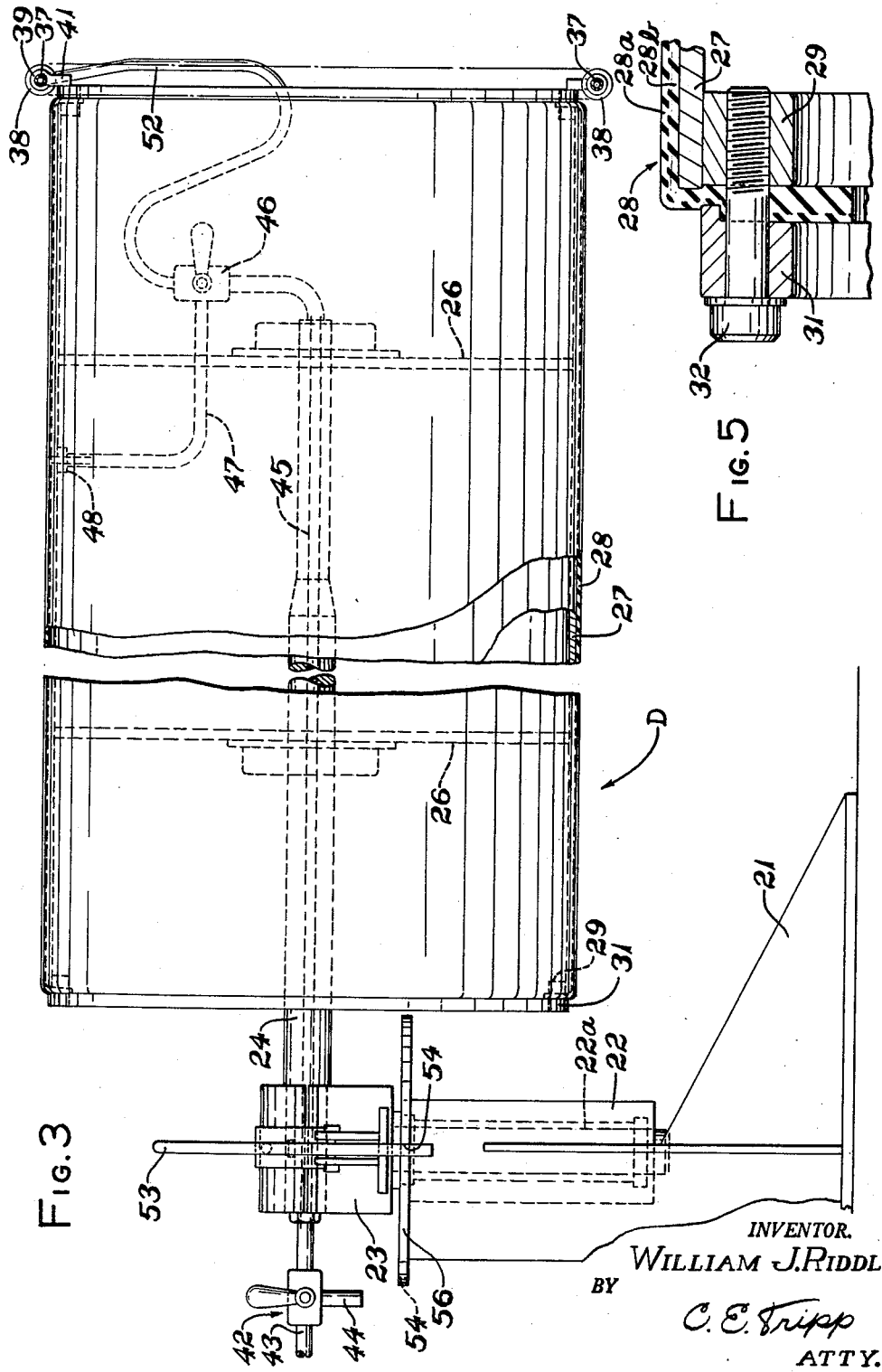
INVENTOR.
WILLIAM J. RIDDLE
BY
C. E. Tripp
ATTY.

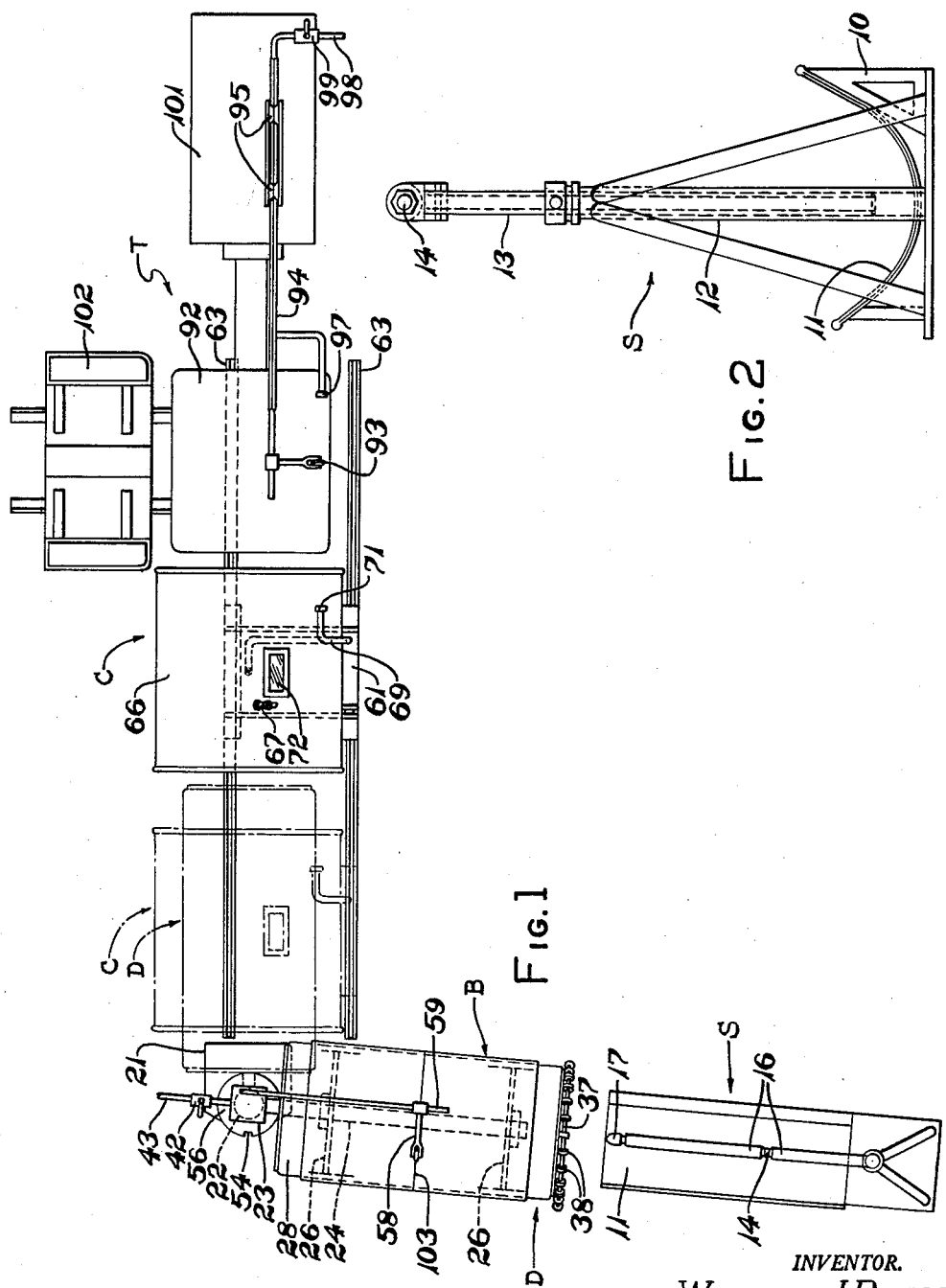

Dec. 25, 1962 W. J. RIDDLE 3,070,478
BAND APPLYING METHOD
Filed Jan. 20, 1958 6 Sheets-Sheet 3
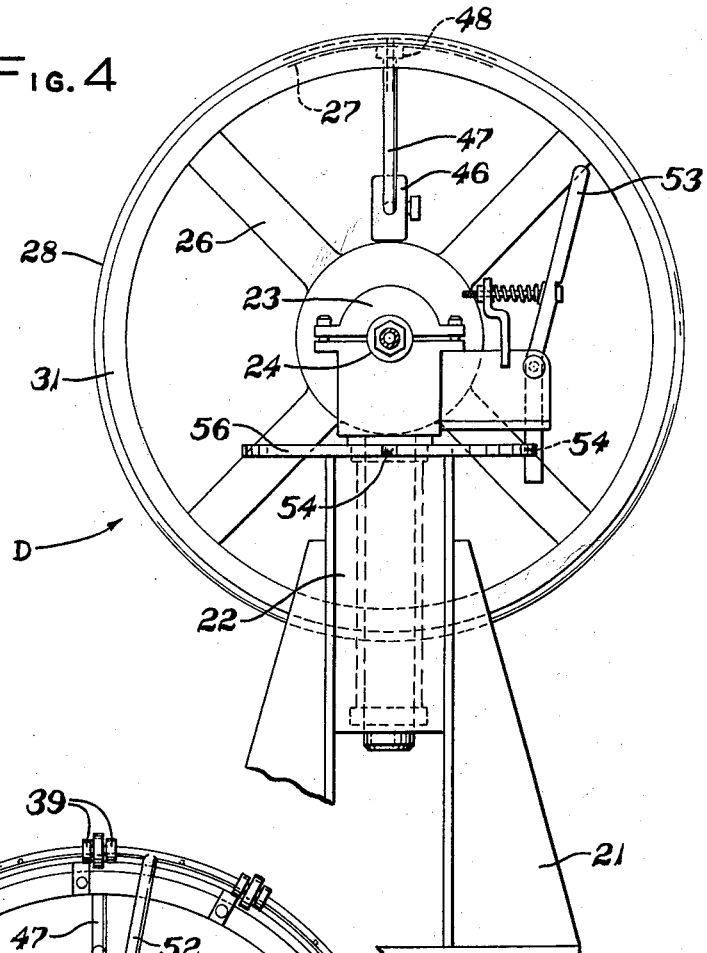
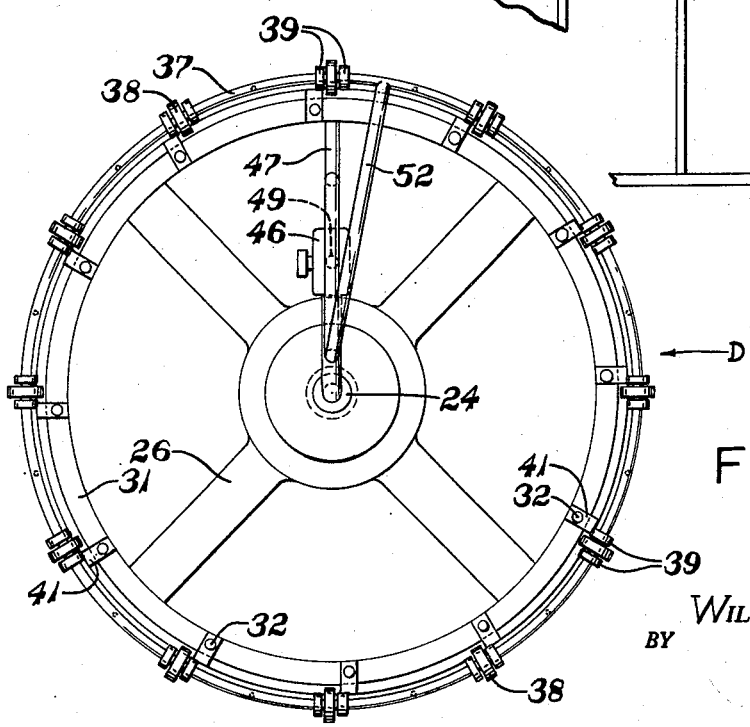
INVENTOR.
WILLIAM J. RIDDLE
BY
C. E. Tripp
ATTY.

Dec. 25, 1962  W. J. RIDDLE  3,070,478
BAND APPLYING METHOD
Filed Jan. 20, 1958  6 Sheets-Sheet 4

INVENTOR.
WILLIAM J. RIDDLE
BY
C. E. Tripp
ATTY.

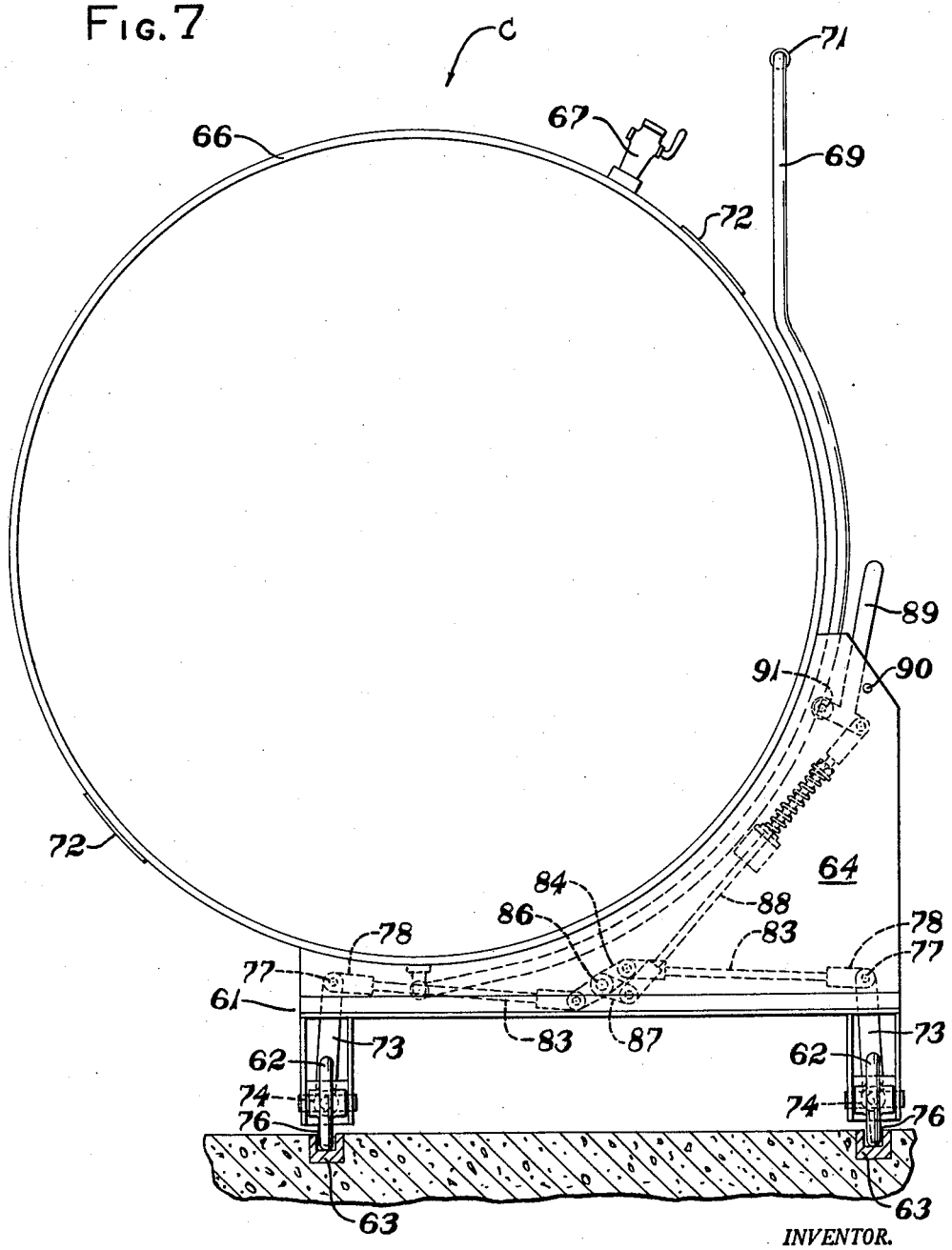

Dec. 25, 1962    W. J. RIDDLE    3,070,478
BAND APPLYING METHOD
Filed Jan. 20, 1958    6 Sheets-Sheet 6
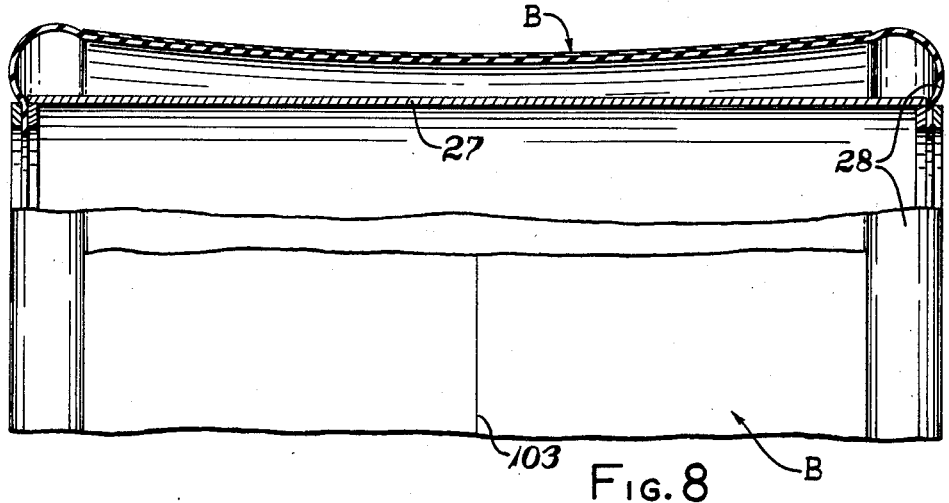
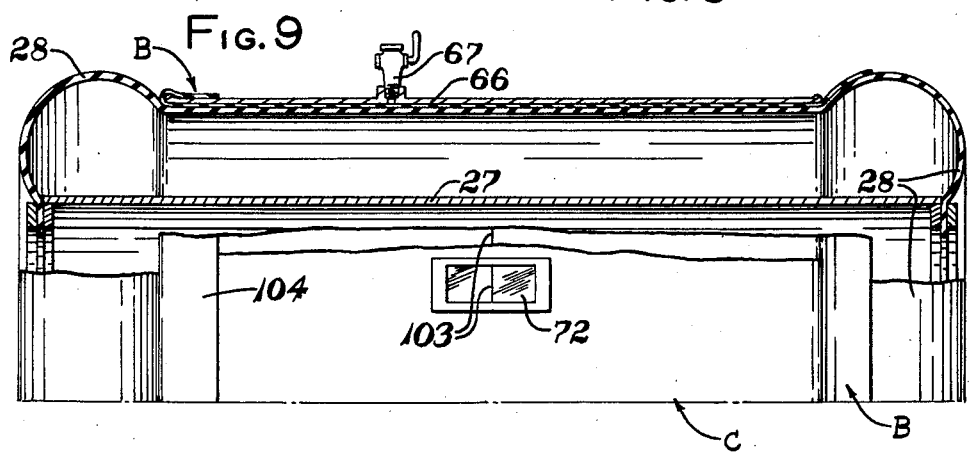
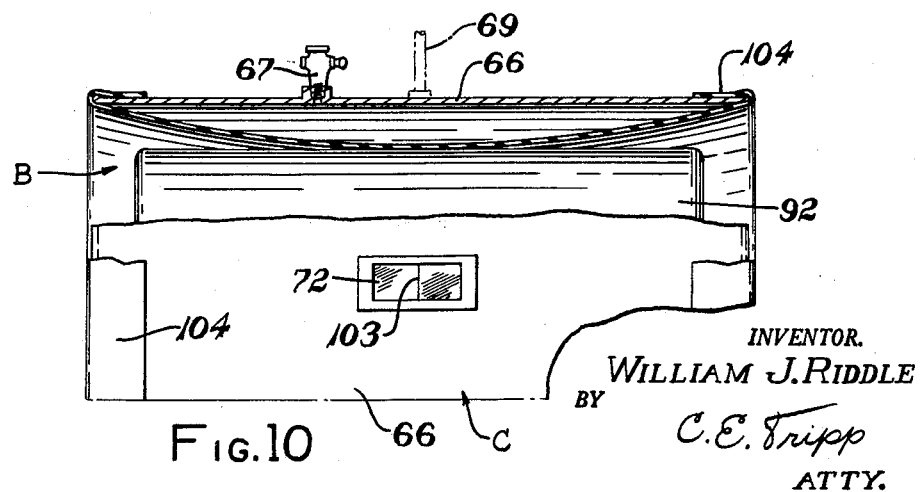
INVENTOR.
WILLIAM J. RIDDLE
BY C. E. Tripp
ATTY.

3,070,478
BAND APPLYING METHOD
William J. Riddle, Cuyahoga Falls, Ohio, assignor to The
B. F. Goodrich Company, New York, N.Y., a corporation of New York
Filed Jan. 20, 1958, Ser. No. 710,061
1 Claim. (Cl. 156—126)

This invention relates to the positioning and application of elastic bands when assembling tire carcasses on tire building drums. Many tires, including the larger and heavier sizes, have their carcasses built by successively applying endless bands of ply material to the tire building drum. The most common means of application employs the use of a roller bar which tends to stretch the bands locally, and is a laborious operation for heavy-duty tires. Proposals have been made to employ applicators using centrifugal means to expand the bands as they are applied to the drum, but this prevents observation and control of the disposition of the bands and may result in non-uniform application, specifically distortion of cord angles. It has also been proposed to employ expanding spiders or bars as part of the application process to place the bands in a vacuum box for transfer to the drum. This tends to locally distort the bands and, when they are not uniformly expanded, they may not be uniformly contracted about the drum. Again, observation and control of the process is not facilitated.

It is a feature of this invention that the bands may be applied to the tire building drum or to a partially assembled tire carcass without heavy manual labor, without distortion and with observation and control of the bands and their position throughout the process. Also, air is not trapped between the band and the tire building drum, but rather is uniformly and progressively expelled from a mid portion of the band and drum toward the edges or ends of the bands, as the band is contracted about the drum.

Briefly, these results are accomplished under the invention by employing a band support member on which the individual bands are placed and arranged before beginning the process, a drum or cylinder having an inflatable bag around its periphery longer than a band transfer shell with the shell being of greater diameter than the band and shorter than the band, and means for moving the transfer shell from the cylinder bag to the tire building drum. The bag cylinder is first aligned with the band support with the bag deflated. The band is slipped over the bag on the cylinder. Air and antifriction means are provided at the outer end of the inflatable bag to facilitate this operation. The cylinder and bag are then pivoted about a vertical axis to a position wherein they are in alignment with the transfer shell. A guide line placed on the band during the building operation may be used at this stage. The cylinder and bag supporting the band are rotated and the bag lightly inflated while observing the guide line relative to an index to see that the guide line is properly positioned and in a plane perpendicular to the axis of the band. This insures that the band is square on the bag so there will be no variation in cord angle when the band is eventually applied to the tire building drum. When the bag has been expanded sufficiently to take the slack out of the band, the transfer shell is telescoped over the cylinder and its band, the inflation of the bag is completed to press the band against the inner surface of the shell to expel air remaining between the band and the shell through the ends of the shell and through a valve provided in the shell. The ends of the band are then cuffed over the shell to act in part as a seal so that as the band tends to shrink in diameter, a partial vacuum is created between the band and the shell to assist in keeping the band in its expanded condition. The air bag is then deflated and the transfer shell is telescoped over the tire building drum. A window in the shell permits centering the band over the drum by means of the guide line on the band and a drum centerline marker extending from the tire machine. Air under pressure is then admitted between the shell and the outer surface of the band so that the band will contract and engage the drum, first at the mid portion of the band and then progressively along the axis towards both ends of the band thereby expelling air that might otherwise be trapped. Trapped air is objectionable and frequently occurs when prior methods of band application are used due to the tacky condition of the band and the outer surface of the partial tire carcass previously assembled over the building drum, whereby air pockets may become sealed in and such pockets are often undetectable during later operations. The band is then uncuffed from the shell and the shell is removed permitting turn down and stitching of the band along its surface and at its end portions to completely expel air. This apparatus and method permits careful individual operation and control of the process and insures that the bands will be square on the drum so that there will be no cord angle variations around the periphery of the tire. The manner in which these features may be obtained will be apparent to one skilled in the art from the following detailed description of a preferred embodiment of the invention.

In the drawings:

FIG. 1 is an over-all plan view of a tire building station embodying the apparatus of the invention;

FIG. 2 is an end view of the band support device;

FIG. 3 is a side view of the drum and inflatable bag assembly;

FIG. 3a is an outer end view of the same assembly;

FIG. 4 is an end view of the assembly at its support means;

FIG. 5 is a fragmentary section showing the bag mounting;

FIG. 7 is an end view of the shell;

FIG. 8 is a diagram showing the band with a partially inflated bag;

FIG. 9 is a diagram showing the bag inflated with the transfer shell telescoped over the band; and FIG. 10 is a diagram showing the transfer shell telescoped over the tire building drum with air having been admitted to partially contract the the band against the drum.

Figure 6:
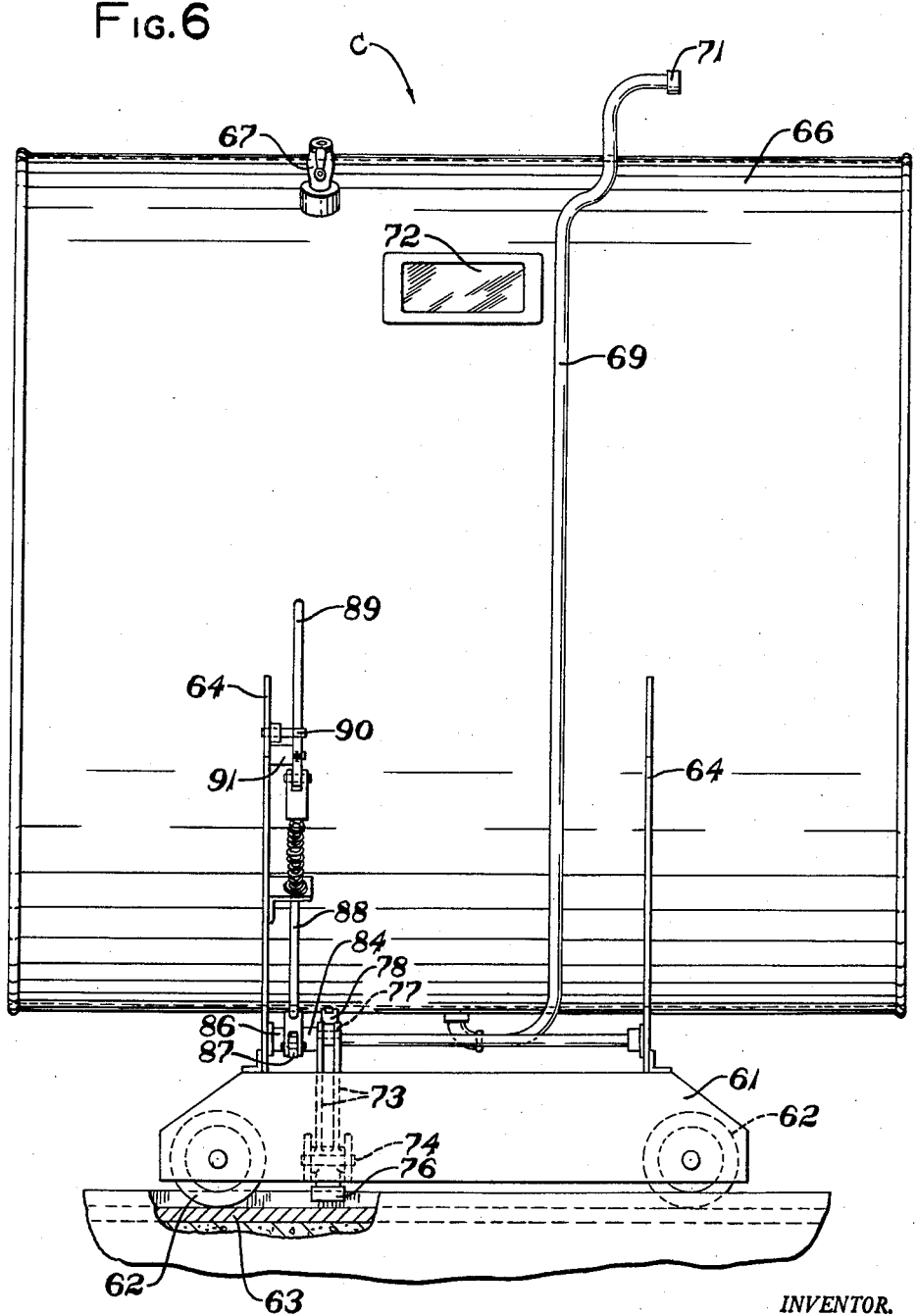
FIG. 6 is a side view of the transfer shell.

Referring to FIG. 1, the band support S is shown in axial alignment with the cylinder D which is in position to receive a band B initially placed on the band support S. The bag cylinder D is pivotally supported so that it can be brought into alignment with a movable transfer shell C mounted on tracks. This enables the transfer shell C to be shifted over the cylinder D to receive the band upon inflation of the bag whereupon the shell can be moved along its tracks to telescope over the building drum of a tire building machine T where there is transfer of the band from the shell to the surface of the tire building drum, or partially assembled tire carcass. The relative position of the bay cylinder D and transfer shell C during inflation of the bag to expand the band against the shell is shown in dot-dash lines in the figure.

Additional details of the construction of the band support device S appear in FIG. 2. It includes a frame 10 carrying a curved pan 11 for suporting the lower part of a depending band. A vertical pedestal 12 mounts a vertically adjustable post 13 which supports a horizontal arm 14 over which the band is slipped. The arm may carry elongated rollers 16 and a rotatable nose 17 to facilitate initial adjustment and preliminary squaring and smoothing of the band before the band is transferred to the bag drum.

The construction of the bag drum appears in FIGS. 3, 3a, 4 and 5. The drum is supported on a pedestal 21 bolted to the floor, to which pedestal is fixed a vertical sleeve 22 in which pivots a vertical post 22a carrying a head 23 from which extends horizontal axle 24. Spiders 26 are pivotally mounted on the axle and fastened to the cylinder sheet metal drum 27. An elastic rubber bag 28 surrounds the drum and, as seen in FIG. 5, is clamped to the fixed end rings 29 of the drum by means of a pair of clamp rings 31 and through bolts 32.

As seen in FIG. 5, in order to minimize frictional resistance to application of the band over the bag, the bag is a composite one having an outer layer 28a of low coefficient of friction rubber such as butyl rubber and an inner layer 28b of highly elastic rubber that does not tend to take permanent set such as natural rubber or GR-S.

As seen in FIGS. 3 and 3a, in addition to coating the bag with butyl rubber, application of the band is further facilitated by providing air jets and rollers at the entrance end of the drum. Circular air pipe 37 mounts a set of rollers 38 maintained by collars 39, there being mounting ears 41 at some of the collars for supporting the assembly on the through bolts 32. Only the upper roller appears in full in FIG. 3.

A three-way valve 42 is fitted to the drum axle for selectively inflating the bag through air supply pipe 43, deflating it through exhaust port 44, or conducting air to the air ring 37 all through an air pipe 45 contained in the drum axle 24. The pipe 45 is connected to a two-way valve 46 which connects to a bag inflation pipe 47 connected to the air bag inflation nipple 48 mounted at an aperture in the metal drum, and in order to supply air to the air ring 37, an air ring supply pipe 52 is connected between the valve 46 and the air ring. Once valve 46 is set to the selected position, control of air supply, air shut off, and air exhaust (for deflating the bag) is by means of outside valve 42.

In order to permit selective alignment of the bag cylinder with the bag support S and with the transfer shell C, an index plate 56 is mounted on the fixed sleeve 22 which is notched at 54 to receive a pivoted latch lever 53 mounted on head 23 that moves with the drum. By suitably placing the notches in the fixed index plate 56, the bag cylinder can be brought into alignment with either the bag support S or the transfer shell C and latched there.

Details of the transfer shell C appear in FIGS. 6 and 7. The carriage 61 rides on wheels 62 that are guided by grooved tracks 63 embedded in the floor. Upstanding brackets 64 on the carriage support the cylindrical metal shell 66 which has an exhaust valve 67 near the top of the shell. Air under pressure may be introduced near the bottom of the shell by means of an air pipe 69 which terminates in a quick disconnect coupling 71. One or more windows 72 are formed in the shell for observing the guide line that is placed on the band when the band is built. In order to maintain the shell over the bag cylinder at a selected position as well as over the tire building drum, a simple brake system is mounted on the carriage. Vertical brake arms 73 are pivoted to the carriage as at 74 (FIG. 6) and have brake shoes 76 on their lower ends for frictional engagement with the side of each track. A spring release lever mechanism is included to actuate the brake shoes. A pin 77 is pivoted to the upper end of each shoe at yoke 78 on the outer end of transfer rods 83. Transfer rods 83 are actuated by a double crank 84 pivoted to a bracket on the carriage at 86 and operated by a crank 87 pivoted to an operating rod 88 at one end and is operated by a hand lever 89 at the other end. The hand lever is pivoted to the carriage 91 and may be held down against the spring by a removable pin 90. Rotation of the lever to the right in FIG. 7 compresses the spring and spreads the operating rods 83 and wedges the brake shoes against the inside of the track.

Details of the tire building machine form no part of the invention and are not described with the exception of the elements relating to the apparatus just described. Referring to FIG. 1, the tire building machine T has a building drum 92 and a centering wheel 93 is supported over the drum in the usual manner. The wheel is mounted on an adjustable horizontal support 92 carried in opposed rollers 96 (only the upper rollers appear) so that the arm can be brought out from its retracted position to a selected position corresponding to the mid plane of the tire building drum. Adjustable stop means not shown are provided to retain the arm in the selected center position. In this invention the arm support serves as an air supply for the transfer carriage. The arm support 94 is hollow and connects to a quick disconnect coupling 97 arranged to connect to couple 71 on the transfer shell. Air is supplied to the hollow arm support 94 by conduit 98 which may be controlled by a valve 99. The tire building machine includes the usual drum drive mechanism 101 and turn down stitching mechanism 102.

Operation

The operation of the device can be understood from FIGS. 1, 3 and 8–10. Band B, built on a separate band building machine, is arranged on the band support S and straightened and smoothed out on the support preparatory for the application process. The centerline 103, as seen in FIG. 8 for example, will have been applied to the band on the band building drum. The process is started by swinging the bag cylinder D into alignment with the drum support S using the latch mechanism previously described for alignment. The valve 46 in the drum is turned to direct air to the air ring 37 at the outer end of the drum which, coupled with the rollers on the ring, facilitates transferring of the band from its support to the drum as air is admitted through valve 42 (FIG. 3). The bag cylinder should always be longer than the widest band expected to be encountered and should be of a diameter smaller than that of the smallest diameter band that is expected to be encountered.

The band need not be accurately centered on the bag cylinder. The important thing is that the band be applied without wrinkles and in a manner so that the centerline lies in a plane perpendicular to the axis of the cylinder. Otherwise, there may be variations in cord angle in the finished tire and other irregularities that produce unequal tensions in the cured carcass. Valve 46 in the cylinder is now turned to direct air to pipe 47 to inflate the bag when valve 42 is opened, and during this process the drum is rotated by hand and the centerline 103 is observed relative to the arm 58 at the cylinder, FIG. 1. It is not important whether this process be carried out with the cylinder in the position shown in FIG. 1, or whether the latch be released and the cylinder be swung around into alignment with the transfer shell C. During this initial inflation, the operator manipulates the bag and smooths it and sees to it that when the slack in the band is fully taken up the centerline is perfectly square. Only a relatively slight pressure such as a few pounds or less per square inch is required whereupon the air supply is cut off by valve 42. The assembly will now appear as in FIG. 8. The transfer carriage C is then telescoped over the band. The centerline 103 is observed through the windows 72 in the shell although it is not important that the band and shell be accurately centered. Of course, the guide arm 59 will have been swung clear to avoid interference with the transfer shell. Mechanism for swinging this arm is well-known in the tire building art and forms no part of this invention. With the transfer carriage in place over the bag cylinder, valve 42 is again opened to continue inflation of the bag and the bag cylinder rotated by hand to observe the action of the centerline and to assure even distribution of stretch until the band actually engages the interior surface of the transfer shell. The exhaust valve 67 on the transfer shell will be open during this operation. Inflation is continued until, as shown in FIG. 9, pressure contact of the band with the interior of the shell exists along the entire length of the shell. When this occurs, the amount of air is increased to insure smooth non-wrinkled transfer to the shell although the pressure used is a matter of judgment and depends on the size and fabrication of the bag and the band. A pressure of about 3 p.s.i. is typical. When it is decided that pressure is sufficient, valve 42 is turned to cut off inflation and the atmosphere valve 67 is now closed so that there is virtually no air disposed between the band and the interior of the shell. The ends of the band are then cuffed around the ends of the shell as at 104 in FIG. 9 (only the left end has been cuffed) to seal against entrance of air between the shell and band, and to hold the edges of the band from shifting toward the center. The bag is then deflated. The cuffs 104 combined with the atmospheric pressure acting on the inside of the band soon balances the tendency of the band to shrink in diameter because such shrinkage results in a partial vacuum between the band and the shell. Thus, the band is maintained in a virtually cylindrical position at the inside of the shell so that it will readily clear the tire building drum and any bands previously assembled on the drum.

The carriage brake is now released, the shell shifted to the tire building drum, and the guide line on the band is centered over the drum using the guide wheel 93. The brake is now set and the coupling parts 71—97 connected to give an air supply to the transfer shell. Air valve 99 is now opened which admits air to pipe 69 causing the band to contract and move towards the tire building drum as seen in FIG. 10. Pipe 69 is actually at the bottom but is shown schematically at the top in FIG. 9. The engagement begins in the mid zone of the band and moves progressively towards each side so that air is not trapped in the process, and the band is applied gradually and uniformly to the tire building drum without distortion of the cords, local wrinkling, stretching, or other deformations. When suitable pressure is built up between the band and the transfer shell to virtually complete engagement of the band with the tire drum, the air supply valve is closed and the cuffs 104 are turned away from the ends of the transfer shell. The carriage brake is now released and the transfer carriage moved clear whereupon the ends of the band can be turned down around the ends of the drum and stitched in the usual manner. The amount of smoothing and adjusting of the band on the drum will be greatly minimized due to the uniform symmetrical manner in which it has been applied to the shell and in turn to the drum, and there will be no local zones of slacks that must be worked out as is the case when roller bars, expandable spiders, and the like are employed. Since the band has been under observation and control during critical stages in the process, it will be squarely laid on the drum so that the cord angle will be consistent about the circumference.

Having completed a detailed description of a preferred embodiment of the invention so that those skilled in the art may practice the same, I claim:

The method of applying tire bands to a tire building drum comprising the steps of positioning a tire band to encircle an inflatable bag, positioning a band transfer shell which is shorter axially than the width of the band to encircle the band on said bag, inflating the bag to expand said band circumferentially toward the interior of the shell, releasably engaging the margins of the band to the end regions of the shell in air tight relation, separating the resulting assembly of the band and the shell from the bag and positioning said assembly about a tire-building drum, then maintaining the band with said margins so engaged with the shell while admitting air between the shell and the inter-marginal regions of said band for forcing said regions of the band against said drum progressively from the central regions of the band toward its margins, and then releasing said margins and bringing the margins into engagement with the drum.

References Cited in the file of this patent

UNITED STATES PATENTS

| | | |
|---|---|---|
| Re. 19,895 | State | Mar. 24, 1936 |
| 1,643,202 | Denmire | Sept. 20, 1927 |
| 2,182,176 | Maranville | Dec. 5, 1939 |
| 2,517,889 | Kuffler | Aug. 8, 1950 |
| 2,521,143 | Benson | Sept. 5, 1950 |
| 2,614,951 | Iredell | Oct. 21, 1952 |
| 2,642,921 | Appleby | June 23, 1953 |
| 2,679,886 | Sapp et al. | June 1, 1954 |
| 2,822,025 | Hollis | Feb. 4, 1958 |
| 2,822,027 | Hollis | Feb. 4, 1958 |
| 2,871,912 | Kraft | Feb. 3, 1959 |

FOREIGN PATENTS

| | | |
|---|---|---|
| 541,895 | Canada | June 4, 1957 |